United States Patent
Smith et al.

(10) Patent No.: US 7,258,058 B2
(45) Date of Patent: Aug. 21, 2007

(54) METERING VALVE WITH INTEGRAL RELIEF AND MAKEUP FUNCTION

(75) Inventors: David P. Smith, Reddick, IL (US); Daniel T. Mather, Lockport, IL (US); Wayne W. Lark, Joliet, IL (US)

(73) Assignees: Caterpillar Inc, Peoria, IL (US); Shin Caterpillar Mitsubishi Ltd. (JP)

( * ) Notice: Subject to any disclaimer, the term of this patent is extended or adjusted under 35 U.S.C. 154(b) by 31 days.

(21) Appl. No.: 11/214,957

(22) Filed: Aug. 31, 2005

(65) Prior Publication Data

US 2007/0044649 A1    Mar. 1, 2007

(51) Int. Cl.
 *F15B 13/04*    (2006.01)
(52) U.S. Cl. ...................... 91/454; 251/30.02
(58) Field of Classification Search .................. 91/454; 251/30.01, 30.02, 30.03, 33, 43, 44
See application file for complete search history.

(56) References Cited

U.S. PATENT DOCUMENTS

| 5,137,254 A | 8/1992 | Aardema et al. |
| 5,421,545 A | 6/1995 | Schexnayder |
| 5,645,263 A | 7/1997 | Aardema |
| 5,709,368 A | 1/1998 | Hajek, Jr. |
| 5,868,059 A | 2/1999 | Smith |
| 6,047,944 A | 4/2000 | Hajek, Jr. |
| 6,089,528 A | 7/2000 | Hajek, Jr. et al. |
| 6,502,393 B1 | 1/2003 | Stephenson et al. |
| 6,694,859 B2 | 2/2004 | Smith |
| 6,748,738 B2 | 6/2004 | Smith |
| 6,769,252 B2 | 8/2004 | Smith |
| 6,848,475 B2 | 2/2005 | Smith |

*Primary Examiner*—Michael Leslie
(74) *Attorney, Agent, or Firm*—Finnegan, Henderson, Farabow, Garrett & Dunner (57) ABSTRACT

A metering valve for a work machine hydraulic system is disclosed. The metering valve has an inlet and an outlet, a main poppet, and a solenoid-operated pilot element. The main poppet is movable to pass fluid from the inlet to the outlet, and to block fluid from the inlet to the outlet. The solenoid-operated pilot element is movable between a first position at which pressurized fluid from the inlet pressurizes a control chamber in communication with a control end of the main poppet to urge the main poppet toward the flow-blocking position, and a second position at which the control chamber is communicated with a drain to move the main poppet toward the flow-passing position. The metering valve also has a relief valve element configured to drain pressurized fluid from the control chamber to move the main poppet toward the flow-passing position in response to a pressure at the inlet exceeding a predetermined pressure.

24 Claims, 5 Drawing Sheets

METERING VALVE WITH INTEGRAL RELIEF AND MAKEUP FUNCTION

TECHNICAL FIELD

The present disclosure relates generally to an electro-hydraulic metering valve and, more particularly, to an electro-hydraulic metering valve having integral relief and makeup functions.

BACKGROUND

Work machines such as, for example, excavators, loaders, dozers, motor graders, and other types of heavy machinery use one or more hydraulic actuators to accomplish a variety of tasks. These actuators are fluidly connected to a pump on the work machine that provides pressurized fluid to chambers within the actuators. An electro-hydraulic valve arrangement is typically fluidly connected within a hydraulic circuit between the pump and the actuators to control a flow rate of pressurized fluid to and from the chambers of the actuators to facilitate movement of the actuators. Multiple separate makeup and pressure relief valves are generally associated with the electro-hydraulic valve arrangement to maintain required pressure levels within the hydraulic circuit. However, these multiple makeup and pressure relief valves add cost to the hydraulic circuit and reduce reliability of the hydraulic circuit.

One method of reducing cost and improving reliability of the hydraulic circuit is described in U.S. Pat. No. 5,868,059 (the '059 patent) issued to Smith on Feb. 9, 1999. The '059 patent describes a hydraulic circuit having four independent metering valves to control draining and filling functions of an associated hydraulic actuator. Each of the independent metering valves includes a main valve element movable to communicate a chamber of the actuator with either a drain port or a supply port. A control chamber is selectively communicated with an external source of pressurized pilot fluid or drained of the pressurized pilot fluid to initiate movement of the main valve element. Each of the independent metering valves associated with a draining function includes an integral relief valve means and an integral makeup valve means. The relief valve means functions to drain fluid from the hydraulic circuit when pressure within the circuit exceeds a predetermined value. The makeup valve means functions to direct pressurized fluid to the hydraulic circuit when pressure within the circuit drops below a predetermined value.

Although the hydraulic circuit described in the '059 patent may reduce cost and improve reliability by combining the relief and makeup functions into the independent metering valves, the hydraulic circuit may still be costly, lack efficiency, and may limit design flexibility. Specifically, because the independent metering valves of the '059 patent require an external source of pressurized pilot fluid, overall system cost may be significant. In addition, energy must be expended to operate the external source of pressurized pilot fluid, which may reduce efficiency of the hydraulic circuit. Further, because the hydraulic circuit of the '059 system requires a connection to the external pilot source, the location of the metering valves may be limited and the associated piping between the valves and the pilot source may further increase cost of the system.

The disclosed metering valve is directed to overcoming one or more of the problems set forth above.

SUMMARY OF THE INVENTION

In one aspect, the present disclosure is directed to a metering valve. The metering valve includes a valve body having an inlet and an outlet, a main poppet, and a solenoid-operated pilot element. The main poppet is disposed within the valve body between the inlet and the outlet, has a nose end and a control end, and is movable between a flow-passing position at which fluid flows from the inlet to the outlet, and a flow-blocking position at which fluid flow between the inlet and outlet is blocked. The solenoid-operated pilot element is movable between a flow-blocking position at which pressurized fluid from the inlet pressurizes a control chamber in communication with the control end of the main poppet to urge the main poppet toward the flow-blocking position, and a flow-passing position at which the control chamber is communicated with a drain to move the main poppet toward the flow-passing position. The metering valve also includes a relief valve element configured to drain pressurized fluid from the control chamber to move the main poppet toward the flow-passing position in response to a pressure at the inlet exceeding a predetermined pressure.

In another aspect, the present disclosure is directed to a method of operating a metering valve. The method includes moving a pilot element between a flow-blocking position at which pressurized fluid from a chamber of an actuator retains a main poppet in a flow-blocking position to block fluid from flowing from the chamber, and a flow-passing position at which a control end of the main poppet is communicated with a drain to move the main poppet toward a flow-passing position to drain the chamber. The method also includes automatically moving the main poppet toward the flow-passing position in response to a pressure of the fluid within the chamber exceeding a predetermined value to allow fluid to drain from the chamber.

DETAILED DESCRIPTION

Figure 1:
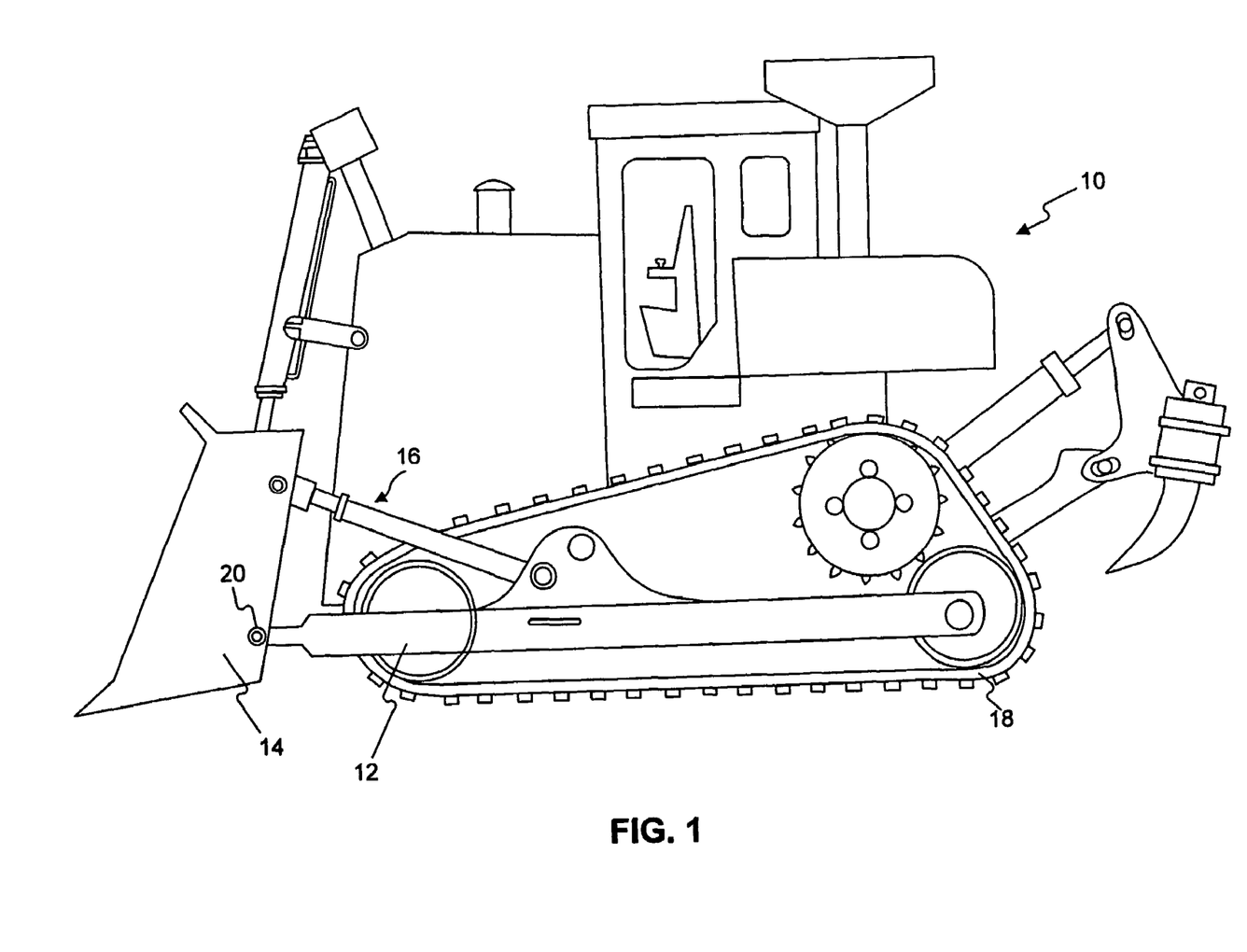
FIG. 1 is a side-view diagrammatic illustration of a work machine according to an exemplary disclosed embodiment.

FIG. 1 illustrates an exemplary work machine 10. Work machine 10 may embody a mobile machine that performs some type of operation associated with an industry such as mining, construction, farming, transportation, or any other industry known in the art. For example, work machine 10 may be an earth moving machine such as an excavator, a dozer, a loader, a backhoe, a motor grader, a dump truck, or any other earth moving machine. Work machine 10 may also embody a fixed or stationary machine such as a generator set, a pump, or any other suitable operation-performing work machine. Work machine 10 may include a frame 12, at least one work implement 14, and a hydraulic cylinder 16 connecting work implement 14 to frame 12. It is contemplated that hydraulic cylinder 16 may be omitted, if desired, and a hydraulic motor or other similar actuator alternatively included.

Frame 12 may include a structural unit that supports movement of work machine 10. For example, frame 12 may embody a stationary base frame connecting a power source (not shown) to a traction device 18, a movable frame member of a linkage system, or any other frame known in the art.

Work implement 14 may embody a device used in the performance of a task. For instance, work implement 14 may embody a blade, a bucket, a shovel, a ripper, a dump bed, a propelling device, or any other task-performing device known in the art. Work implement 14 may be connected to frame 12 via a direct pivot 20, via a linkage system with hydraulic cylinder 16 forming one member in the linkage system, or in any other appropriate manner. Work implement 14 may be configured to pivot, rotate, slide, swing, or move relative to frame 12 in any other manner known in the art.

Figure 2:
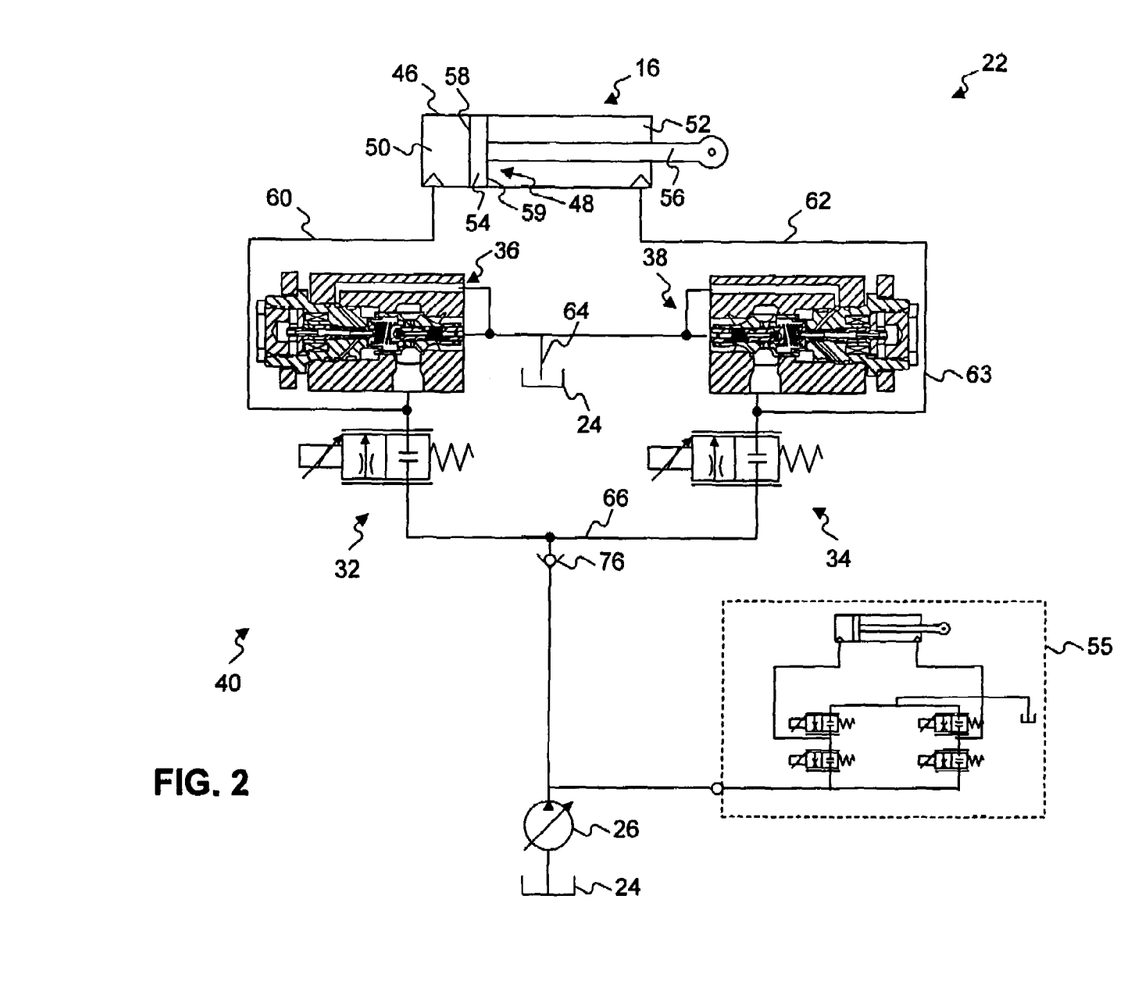
FIG. 2 is a schematic illustration of an exemplary disclosed hydraulic system for the work machine of FIG. 1.

As illustrated in FIG. 2, hydraulic cylinder 16 may be one of various components included within a hydraulic system 22 that cooperate to move work implement 14 (referring to FIG. 1). Hydraulic system 22 may include a tank 24, a source 26 of pressurized fluid, a head-end supply valve 32, a rod-end supply valve 34, a head-end drain valve 36, and a rod-end drain valve 38. It is contemplated that hydraulic system 22 may include additional and/or different components such as, for example, a pressure sensor, a temperature sensor, a position sensor, a controller, an accumulator, and other hydraulic system components known in the art.

Hydraulic cylinder 16 may include a tube 46 and a piston assembly 48 disposed within tube 46. One of tube 46 and piston assembly 48 may be pivotally connected to frame 12, while the other of tube 46 and piston assembly 48 may be pivotally connected to work implement 14. It is contemplated that tube 46 and/or piston assembly 48 may alternatively be fixedly connected to either frame 12 or work implement 14. Hydraulic cylinder 16 may include a first chamber 50 and a second chamber 52 separated by piston assembly 48. First and second chambers 50, 52 may be selectively supplied with a fluid pressurized by source 26 and fluidly connected with tank 24 to cause piston assembly 48 to displace within tube 46, thereby changing the effective length of hydraulic cylinder 16. The expansion and retraction of hydraulic cylinder 16 may function to assist in moving work implement 14.

Piston assembly 48 may include a piston 54 axially aligned with and disposed within tube 46, and a piston rod 56 connectable to one of frame 12 and work implement 14 (referring to FIG. 1). Piston 54 may include a first hydraulic surface 58 and a second hydraulic surface 59 opposite first hydraulic surface 58. An imbalance of force caused by fluid pressure on first and second hydraulic surfaces 58, 59 may result in movement of piston assembly 48 within tube 46. For example, a force on first hydraulic surface 58 being greater than a force on second hydraulic surface 59 may cause piston assembly 48 to displace to increase the effective length of hydraulic cylinder 16. Similarly, when a force on second hydraulic surface 59 is greater than a force on first hydraulic surface 58, piston assembly 48 may retract within tube 46 to decrease the effective length of hydraulic cylinder 16. A sealing member (not shown), such as an o-ring, may be connected to piston 54 to restrict a flow of fluid between an internal wall of tube 46 and an outer cylindrical surface of piston 54.

Tank 24 may constitute a reservoir configured to hold a supply of fluid. The fluid may include, for example, a dedicated hydraulic oil, an engine lubrication oil, a transmission lubrication oil, or any other fluid known in the art. One or more hydraulic systems within work machine 10 may draw fluid from and return fluid to tank 24. It is also contemplated that hydraulic system 22 may be connected to multiple separate fluid tanks.

Source 26 may be configured to draw fluid from tank 24 and produce a flow of pressurized fluid directed through hydraulic system 22. Source 26 may embody a pump such as, for example, a variable displacement pump, a fixed displacement pump, or any other source of pressurized fluid known in the art. Source 26 may be drivably connected to a power source (not shown) of work machine 10 by, for example, a countershaft (not shown), a belt (not shown), an electrical circuit (not shown), or in any other suitable manner. Source 26 may be dedicated to supplying pressurized fluid to only hydraulic system 22, or alternatively may supply pressurized fluid to additional hydraulic systems 55 within work machine 10.

Head and rod-end supply and drain valves 32-38 may be fluidly interconnected. In particular, head and rod-end drain valves 36, 38 may be connected in parallel to a common drain passageway 64. Head and rod-end supply valves 32, 34 may be connected in parallel to an upstream common fluid passageway 66. Head-end supply and drain valves 32, 36 may be connected in parallel to a fluid passageway 60. Rod-end drain and supply valves 38, 34 may be connected in parallel to a fluid passageway 62.

Head-end supply valve 32 may be disposed between source 26 and first chamber 50 and configured to regulate a flow of pressurized fluid into first chamber 50 in response to a command velocity. Specifically, head-end supply valve 32 may include a proportional spring-biased valve mechanism that is solenoid-actuated to move between a first position at which fluid is allowed to flow into first chamber 50 and a second position at which fluid is blocked from first chamber 50. Head-end supply valve 32 may be movable to any position between the first and second positions to vary the rate of fluid flow into first chamber 50, thereby affecting the velocity of hydraulic cylinder 16. It is contemplated that head-end supply valve 32 may alternatively be hydraulically-actuated, mechanically-actuated, pneumatically-actuated, or actuated in any other suitable manner. It is further contemplated that head-end supply valve 32 may allow fluid from first chamber 50 to flow through head-end supply valve 32 during a regeneration event when a pressure within first chamber 50 exceeds a pressure directed to head-end supply valve 32 from source 26.

Rod-end supply valve 34 may be disposed between source 26 and second chamber 52 and configured to regulate a flow of pressurized fluid to second chamber 52 in response to the command velocity. Specifically, rod-end supply valve 34 may include a proportional spring-biased valve mechanism that is solenoid-actuated to move between a first position at which fluid is allowed to flow into second chamber 52 and a second position at which fluid is blocked from second chamber 52. Rod-end supply valve 34 may be movable to any position between the first and second positions to vary the rate of fluid flow into second chamber 52, thereby affecting the velocity of hydraulic cylinder 16. It is contemplated that rod-end supply valve 34 may alternatively be hydraulically-actuated, mechanically-actuated, pneumatically-actuated, or actuated in any other suitable manner. It is further contemplated that rod-end supply valve 34 may allow fluid from second chamber 52 to flow through rod-end supply valve 34 during a regeneration event when a pressure within second chamber 52 exceeds a pressure directed to rod-end supply valve 34 from source 26.

Figure 3:
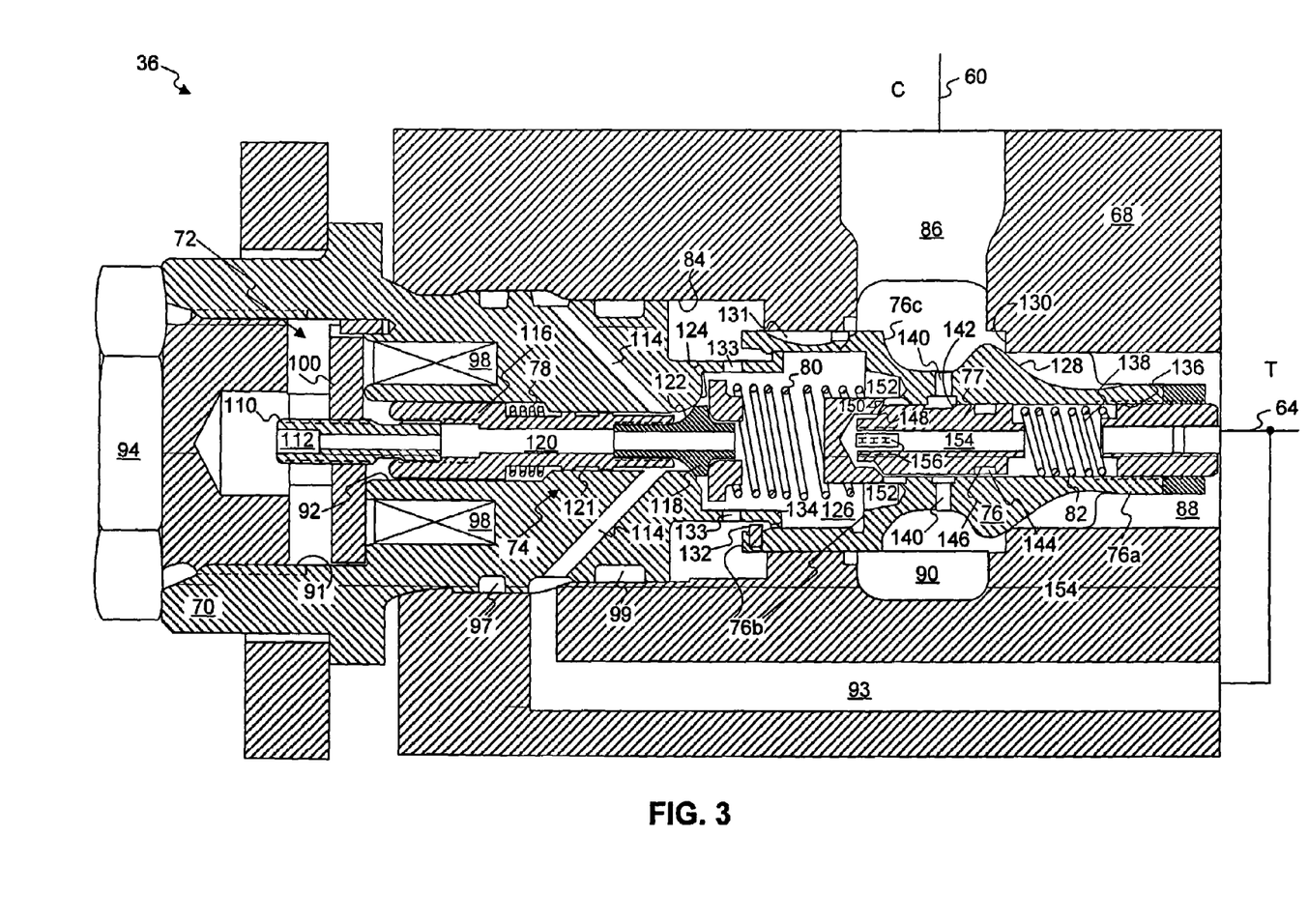
FIG. 3 is a cross-sectional illustration of an exemplary disclosed valve for the hydraulic system of FIG. 2.

Head-end drain valve 36 may be disposed between first chamber 50 and tank 24, and include components that cooperate to regulate a flow of pressurized fluid from first chamber 50. In particular, as illustrated in FIG. 3, head-end drain valve 36 may include a valve body 68, an adapter element 70, a solenoid mechanism 72, a pilot element 74, a main poppet 76, a relief valve element 77, and a plurality of biasing springs 78, 80. It is contemplated that the bias of spring 78 may be reduced or omitted entirely, if desired.

Valve body 68 may include a central bore 84, a cylinder port 86, and a drain port 88. An annulus 90 may connect central bore 84, cylinder port 86, and drain port 88. A drain passageway 93 may also connect central bore 84 and drain port 88. It is contemplated that valve body 68 may be dedicated to housing head-end drain valve 36 or may additionally house one or more of head-end supply valve 32, rod-end drain valve 38, and rod-end supply valve 34.

Adapter element 70 may be disposed within central bore 84 and configured to house solenoid mechanism 72 and pilot element 74. In particular, adapter element 70 may include a central bore 91 for housing solenoid mechanism 72, and a counter bore 92 for housing pilot element 74. A plug 94 may threadingly engage adapter element 70 to cap an end of adapter element 70 that extends from valve body 68. It is contemplated that one or more sealing members (not shown) such as, for example, o-rings or other such sealing devices may be disposed within a groove 97 and a groove 99 of adapter element 70 to minimize leakage between valve body 68 and adapter element 70.

Solenoid mechanism 72 may be disposed within adapter element 70 and configured to proportionally move pilot element 74 against the bias of springs 78 and 80 in response to an applied current. Specifically, solenoid mechanism 72 may include an electromagnetic coil 98 and an armature 100 having a pin 110 threadingly connected to pilot element 74. As current is applied to electromagnetic coil 98, armature 100 may be drawn against the bias of springs 78 and 80 toward electromagnetic coil 98. The magnitude of the current applied to electromagnetic coil 98 may determine the compression of springs 78 and 80 and, in turn, how close armature 100 is drawn toward electromagnetic coil 98. Pin 110 may include a central bore 112 to minimize resistance and the creation of undesired pressure fluctuations within head-end drain valve 36, as armature 100 and pin 110 move axially within adapter element 70.

Pilot element 74 may be a zero-leak type valve that is slidably disposed within adapter element 70 to open and close a series of radially disposed fluid passageways 114. In particular, pilot element 74 may include a pilot stem 116 threadingly connected to a check element 118 and to pin 110. It is contemplated that pilot stem 116 and check element 118 may alternatively embody a single integral component, if desired. Check element 118 may include a male conical surface 122 configured to engage a female conical seat 124 of adapter element 70. When surface 122 and seat 124 are engaged, pilot fluid may be prevented from flowing to fluid passageways 114 via counter bore 92. When solenoid mechanism 72 is energized to draw armature 100 and pin 110 toward electromagnetic coil 98, surface 122 and seat 124 may be moved away from each other, thereby allowing pilot fluid flow into fluid passageways 114 via counter bore 92. Fluid passageways 114 may be in fluid communication with common drain passageway 64 via drain passageway 93, such that pilot fluid flowing through fluid passageways 114 drains to tank 24. The area between surface 122 and seat 124, coupled with the pressure of the fluid within cylinder port 86, may determine a flow rate of fluid from cylinder port 86 to tank 24 via fluid passageways 114. Pilot stem 116 may include an external groove 121 to hold a sealing member (not shown) such as an o-ring to minimize leakage of pilot fluid between pilot element 74 and counter bore 92. A central bore 120 may extend through both pilot stem 116 and check element 118 to fluidly communicate with central bore 112, thereby minimizing resistance and the creation of undesired pressure fluctuations as pilot element 74 axially moves to engage and disengage surface 122 from seat 124.

Main poppet 76 may be a zero-leak type valve that is configured to selectively allow fluid flow from cylinder port 86 to drain port 88. Specifically, a male conical surface 128 of main poppet 76 may be situated to engage a female conical seat 130 of valve body 68. When surface 128 and seat 130 are engaged, fluid flow from cylinder port 86 to drain port 88 may be prevented. Conversely, when surface 128 and seat 130 are away from each other, fluid may flow from cylinder port 86 to drain port 88. The area between surface 128 and seat 130, coupled with the pressure of the fluid at cylinder port 86, may determine a flow rate of fluid from cylinder port 86 to drain port 88.

Surface 128 may selectively engage and disengage seat 130 in response to movement of pilot element 74. In particular, main poppet 76, together with valve body 68, adapter element 70, and pilot element 74, may form a control chamber 126. Forces generated by fluid acting on a nose end 76a of main poppet 76 and by fluid acting on a differential area 76c may oppose a force generated by pilot fluid within control chamber 126 acting on a control end 76b of main poppet 76 and a force generated by the compression of biasing spring 80. To open main poppet 76, surface 122 may be moved away from seat 124 to drain pilot fluid from control chamber 126 via counter bore 92, fluid passageways 114, and drain passageway 93. When pilot fluid is drained from control chamber 126, fluid acting on nose end 76a of main poppet 76 may overcome the force generated by biasing spring 80 to move main poppet 76 toward pilot element 74. To close main poppet 76, solenoid mechanism 72 may be de-energized to allow biasing spring 80 to return pilot element 74 to the flow-blocking position (e.g., where surface 122 engages seat 124). When pilot element 74 is in the flow-blocking position, pressure may build within control chamber 126 to close main poppet 76 (e.g., to move surface 128 into engagement with seat 130).

The pressurized pilot fluid within control chamber 126 may be provided by first chamber 50 of hydraulic cylinder 16 via cylinder port 86. In particular, main poppet 76 may include one or more externally-located channels 131 that fluidly connect cylinder port 86 to control chamber 126 via a pair of orifices 133 disposed within adapter element 70. Each channel 131 may be designed such that at least some fluid from cylinder port 86 is always allowed to flow to control chamber 126, and as main poppet 76 moves toward the flow-passing position, the flow area of channel 131 proportionally increases, thereby allowing a greater flow rate of fluid from cylinder port 86 to control chamber 126.

The opening area between pilot surface 122 and seat 124 may control the rate of fluid flow from and affect the pressure within chamber 126. Specifically, this opening area may be proportional to the movement of pilot check element, which is, in turn, proportional to the force exerted by solenoid mechanism 72. In other words, the position of main poppet 76 may be proportionally controlled by solenoid mechanism 72. This same opening area, coupled with the pressure at cylinder port 86, and the pressure and opening area at drain port 88 may determine the pressure of control chamber 126.

When the pressure with first chamber 50 changes due to shifting cylinder loads, flow through main poppet 76 may also change. In particular, these rapid changes can affect the flow force acting on main poppet 76, causing slight uncommanded movement of main poppet 76. For example, if the flow through main poppet 76 increases, the closing flow forces acting on main poppet 76 may tend to slightly close main poppet 76. As a result, the flow area through channel 131 may decrease, along with the bias acting on check element 118. These actions may cause the opening area between pilot surface 122 and seat 124 to open slightly, thereby draining fluid from the control chamber 126 to tank 24 by way of drain passage 93 and common drain passageway 64. In this situation, because the inlet flow area of control chamber 126 decreases and the outlet flow area increases, the pressure within control chamber 126 may react rapidly, thereby reducing the amount of main poppet movement (e.g., instability) caused by a pressure disturbance.

Main poppet 76 may be operatively connected to adapter element 70 for assembly into valve body 68 as a cartridge-type valve. In one example, main poppet 76 may include a pin member 132 that engages a land 134 of adapter element 70 after assembly of main poppet 76 to adapter element 70. In this manner, a sub assembly consisting of adapter element 70, pilot element 74, main poppet 76, and springs 78 and 80 may be created. A space may be maintained between pin member 132 and adapter element 70 after assembly into valve body 68.

In addition to regulating the intended movement of main poppet 76 and the associated open area between surface 128 and seat 130 associated with the desired movement of work implement 14 (referring to FIG. 1), main poppet 76 may also provide a fluid makeup function. In particular, in order to minimize the likelihood of voiding within first chamber 50 (referring to FIG. 1), main poppet 76 may automatically move in response to the pressure of the fluid within cylinder port 86 dropping below a predetermined pressure. For example, as the pressure of the fluid within cylinder port 86 decreases, the pressure of the pilot fluid within control chamber 126 may likewise decrease because of fluid communication via channel 131. As the pressure within control chamber 126 drops below the predetermined value (determined by the bias of spring 80 and the pressure of the fluid within tank 24), the force of the fluid within drain port 88 acting on nose-end 76a of main poppet 76 may urge main poppet 76 against the bias of spring 80 toward pilot element 74, thereby separating surface 128 from seat 130. When surface 128 is separated from seat 130, fluid may flow from tank 24 to first chamber 50 via drain port 88 and cylinder port 86. As the pressure within first chamber 50 and cylinder port 86 increases with the influx of fluid, the associated increasing pressure within control chamber 126 may eventually urge main poppet 76 to return to its flow-blocking position.

Relief valve element 77 may function to relieve hydraulic system 22 of excessive pressures. Specifically, relief valve element 77 may be disposed within a central bore 136 of main poppet 76 and may be movable from a flow-blocking position at which pilot fluid from control chamber 126 is blocked from flowing to drain port 88 via relief valve element 77, against the bias of a relief spring 138 toward a flow-passing position at which pilot fluid from control chamber 126 is passed to drain port 88 to indirectly relieve the pressure within cylinder port 86. For example, relief valve element 77 may include a male conical surface 148 configured to engage a female conical seat 150 located within central bore 136. When surface 148 is away from seat 150, pilot fluid may pass through a plurality of fluid passageways 152 axially disposed in the control end 76b of main poppet 76, through a central bore 154 of relief valve element 77, to drain port 88. However, when surface 148 is engaged with seat 150, pilot fluid from control chamber 126 may be prevented from flowing to drain port 88 via fluid passageways 152 and central bore 154.

To move relief valve element 77 from the flow-blocking position against the bias of relief spring 138 to the flow-passing positions, pilot fluid from cylinder port 86 may be communicated with relief valve element 77 via a plurality of radially-disposed relief passages 140 within main poppet 76. The pilot fluid directed from cylinder port 86 to relief valve element 77 may act on a hydraulic surface 142 of relief valve element 77 to move relief valve element 77 toward the flow-passing position when the pressure within cylinder port 86 exceeds a predetermined pressure (determined by the bias force of relief spring 138 and the pressure of the fluid at drain port 88). As relief valve element 77 is moved toward the flow-passing position to pass pilot fluid from control chamber 126 to drain port 88, opening forces acting on main poppet 76 may overcome the closing flow forces within control chamber 126 to urge main poppet 76 toward the flow-passing position, thereby allowing additional fluid to drain to tank 24 and directly relieving the pressure spike. A restrictive orifice 156 may be associated with central bore 154 to restrict the rate of fluid flow through central bore 154. A seal 144 may be disposed within a groove 146 of relief valve element 77 to minimize leakage between an outer surface of relief valve element 77 and an interior surface of central bore 136.

Rod-end drain valve 38 (referring to FIG. 2) may be disposed between source 26 and second chamber 52 and include components that cooperate to regulate a flow of pressurized fluid from second chamber 52 to tank 24. Because the components and operation of rod-end drain valve 38 are substantially similar to that of head-end drain valve 36, the description of rod-end drain valve 38 will be omitted from this disclosure.

Figure 4:
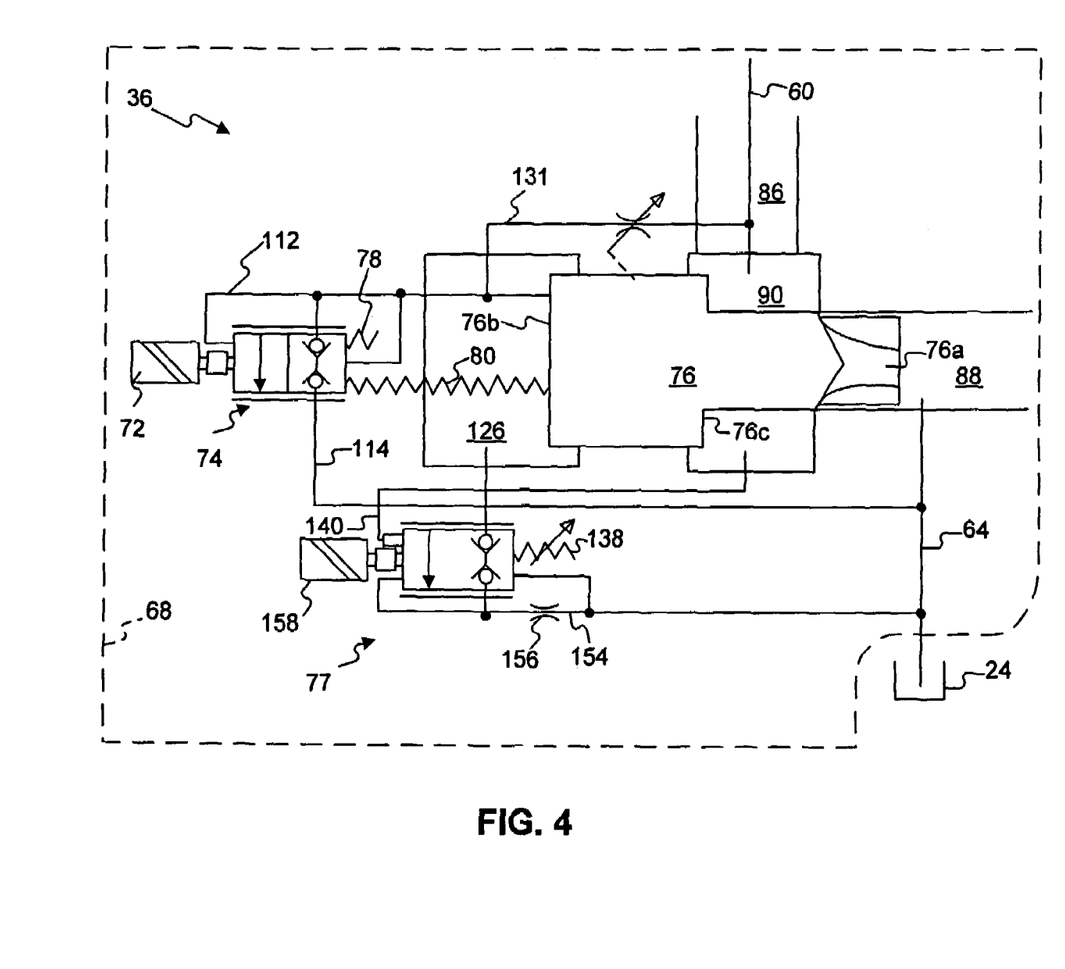
FIG. 4 is a schematic illustration of another exemplary disclosed valve for the hydraulic system of FIG. 2.

FIG. 4 illustrates an alternative embodiment of head-end drain valve 36. Similar to the embodiment of FIG. 3, head-end drain valve 36 of FIG. 4 may include valve body 68, main poppet 76, pilot element 74, solenoid mechanism 72, and relief valve element 77. However, in contrast to relief valve element 77 of FIG. 3, the relief valve element 77 of FIG. 4 may have a variable relief setting. Specifically, a relief solenoid mechanism 158 may be associated with relief valve element 77 of FIG. 4 to selectively and directly bias relief valve element 77 with or against the bias of relief spring 138. In this manner, the force required to move relief valve element 77 may be increased or decreased by varying the current applied to relief solenoid mechanism 158.

Figure 5:
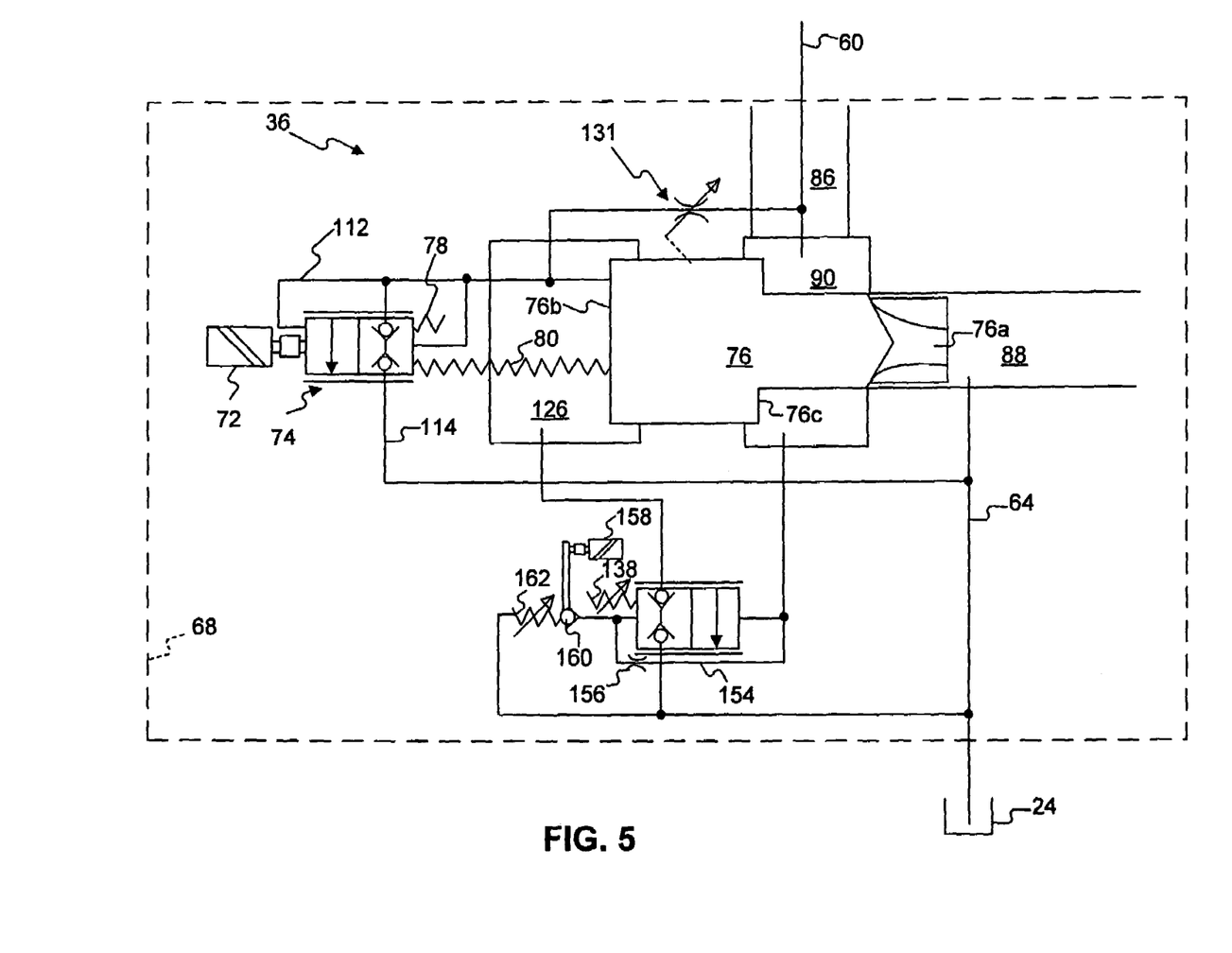
FIG. 5 is a schematic illustration of another exemplary disclosed valve for the hydraulic system of FIG. 2.

FIG. 5 illustrates another alternative embodiment of head-end drain valve 36. Similar to the embodiment of FIG. 4, head-end drain valve 36 of FIG. 5 includes valve body 68, main poppet 76, pilot element 74, solenoid mechanism 72, relief valve element 77, and relief solenoid mechanism 158 providing a variable relief function. However, in contrast to relief solenoid mechanism 158 of FIG. 4, relief solenoid mechanism 158 depicted in FIG. 5 may act on relief valve element 77 indirectly. In particular, in the embodiment of FIG. 5, instead of directly acting to move relief valve element 77, relief solenoid mechanism 158 may act to move a relief pilot valve element 160 with or against a relief pilot valve spring 162. Relief pilot valve element 160 may be moveable from a flow-blocking position at which pilot fluid from cylinder port 86 may act with the bias of relief spring 138, to a flow-passing position at which pilot fluid from cylinder port 86 is drained to tank 24. If pilot fluid from cylinder port 86 acts with the bias of relief spring 138, the force required to move relief valve element 77 toward the flow-passing position may be greater than if the pilot fluid from cylinder port 86 does not act with the bias of relief spring 138. In this manner, the force and corresponding size of relief solenoid mechanism 158 required to provide the relief setting of relief valve element 77 may be reduced, as compared to the embodiment of FIG. 4.

INDUSTRIAL APPLICABILITY

The disclosed hydraulic system may be applicable to any work machine that includes a fluid actuator where precise control of pressures and/or flows of fluid associated with the actuator is desired. The disclosed hydraulic system may provide high-response pressure regulation that results in consistent, predictable actuator performance in a low-cost, simple configuration. The operation of hydraulic system 22 will now be explained.

Hydraulic cylinder 16 may be movable by fluid pressure in response to an operator input. Fluid may be pressurized by source 26 and directed to head-end and rod-end supply valves 32 and 34. In response to an operator input to either extend or retract piston assembly 48 relative to tube 46, the appropriate one of head and rod-end supply valves 32, 34 may be actuated to fill one of first and second chambers 50, 52 with pressurized fluid at a rate corresponding to a desired work tool velocity. Substantially simultaneously, solenoid mechanism 72 of the appropriate one of head and rod-end drain valves 36, 38 may be energized to draw armature 100 toward electromagnetic coil 98. As armature 100 is drawn toward electromagnetic coil 98, connected pilot element 74 may move to disengage surface 122 from seat 124 an appropriate amount to thereby drain pilot fluid from control chamber 126 at an appropriate rate. As control chamber 126 is drained, a pressure differential may be created across main poppet 76 that overcomes the bias of spring 80 and causes surface 128 of main poppet 76 to disengage seat 130 of valve body 68 an appropriate amount, thereby fluidly connecting cylinder port 86 to drain port 88 and subsequently draining the one of first and second chambers 50, 52 of pressurized fluid. The filling of one of first and second chambers 50, 52 and the draining of the other of first and second chambers 50, 52 may facilitate movement of piston assembly 48 within tube 46, and corresponding movement of work implement 14.

The amount of current supplied to solenoid mechanism 72 may be based on an assumed pressure of the fluid within control chamber 126 and a desired flow rate of fluid from control chamber 126. In particular, the amount of current directed to electromagnetic coil 98 may correspond to a compression of springs 78 and 80 that results in a predetermined flow area between surface 122 and seat 124. The predetermined flow area between surface 122 and seat 124 may facilitate a predetermined rate of pilot fluid flow from control chamber 126 and the subsequent pressure differential across main poppet 76 that creates a predetermined flow area between surface 128 and seat 130. Similarly, the predetermined flow area between surface 128 and seat 130 may facilitate a predetermined rate of fluid flow from cylinder port 86 to drain port 88 that results in the desired actuation speed of hydraulic cylinder 16. The relationship between the applied current and the compression of springs 78 and 80 and the main metering flow forces that results in the desired flow areas may be determined through analytical practices, lab testing, field testing, and/or through other methods known in the art.

Head and rod-end drain valves 36, 38 may accommodate for situations where the pressure of the fluid within hydraulic system 22 deviates from the assumed pressure. Specifically, during operation of hydraulic cylinder 16, it is possible for the pressure within hydraulic cylinder 16 to exceed or decrease below the assumed pressure. If left unregulated, these pressure fluctuations could result in inconsistent and/or unexpected motion of hydraulic cylinder 16 and work implement 14. These affects may be accounted for by movement of main poppet 76 during a pressure drop, and movement of relief valve element 77 during a pressure spike. For example, as the pressure within hydraulic cylinder 16 decreases below a predetermined pressure value, the force generated at nose-end 76a of main poppet 76 may overcome the bias force of spring 80 and the closing forces within control chamber 126 to move main poppet 76 to the flow-passing position. When in the flow passing position, fluid from tank 24 may be allowed to enter first chamber 50 via cylinder port 86, thereby minimizing the likelihood of voiding within first chamber 50. The area of control channel 131 may have an area gain increase near full poppet stroke to help dampen the quick shift that can be generated by this make-up function. Conversely, as the pressure within first chamber 50 and cylinder port 86 increases beyond a predetermined pressure value, pilot fluid communicated from cylinder port 86 to hydraulic surface 142 via relief passageways 140 may bias relief valve element 77 toward the flow-passing position. When in the flow-passing position, pilot fluid from control chamber 126 may drain to tank 24 via axial passageways 152, central bore 154, and drain port 88, thereby indirectly relieving the pressure spike within first chamber 50 and cylinder port 86. As pilot fluid drains from control chamber 126, main poppet 76 may move toward the flow-passing position to pass additional fluid to tank 24, thereby directly relieving the pressure spike. The flow area of channel 131 may have a small flow area that always communicates some fluid from cylinder port 86 to chamber 126, thereby allowing a fast response of this relief function, which may help to prevent pressure overshoot. The area gain of control channel 131 described above may help dampen the quick shift that can be generated by this relief function.

Because head and rod-end drain valves 36, 38 may be actuated using pressurized pilot fluid from first and second chamber 50, 52, respectively, the cost of hydraulic system 22 may be reduced, and design flexibility improved. Specifically, because the pressurized pilot fluid that actuates head and rod-end drain valves 36, 38 comes from hydraulic cylinder 16, the component cost and operating cost of hydraulic system 22 may be lower than if an external source provided the pilot fluid. In addition, because the source of pilot fluid is hydraulic cylinder 16 rather than an externally-located source, head and rod-end drain valves 36, 38 may be remotely located and may require minimal piping.

It will be apparent to those skilled in the art that various modifications and variations can be made to the disclosed metering valve and hydraulic system. Other embodiments will be apparent to those skilled in the art from consideration of the specification and practice of the disclosed metering valve and hydraulic system. For example, it is contemplated that head and rod-end supply valves 32, 34 (referring to FIG. 2) may be substantially similar in construction and function to head and rod-end drain valves 36, 38. It is intended that the specification and examples be considered as exemplary only, with a true scope being indicated by the following claims and their equivalents.

What is claimed is:

1. A metering valve, comprising:
   a valve body having an inlet and an outlet;
   a main poppet being disposed within the valve body between the inlet and the outlet, having a nose end and a control end, and being movable between a flow-passing position at which fluid flows from the inlet to the outlet, and a flow-blocking position at which fluid flow between the inlet and outlet is blocked;
   a solenoid-operated pilot element movable between a flow-blocking position at which pressurized fluid from the inlet pressurizes a control chamber in communication with the control end of the main poppet to urge the main poppet toward the flow-blocking position, and a flow-passing position at which the control chamber is communicated with a drain to move the main poppet toward the flow-passing position; and
   a relief valve element disposed between the inlet and the outlet and configured to drain pressurized fluid from the control chamber to move the main poppet toward the flow-passing position in response to a pressure at the inlet exceeding a predetermined pressure.

2. The metering valve of claim 1, wherein the main poppet is automatically movable toward the flow-passing position to allow fluid to flow from the outlet to the inlet when the pressure at the outlet exceeds the pressure at the inlet.

3. The metering valve of claim 1, wherein the relief valve element is disposed within a central bore of the main poppet.

4. The metering valve of claim 3, further including a restrictive orifice disposed within the relief valve element and configured to dampen pressure fluctuations of the fluid draining through the relief valve element.

5. The metering valve of claim 3, further including a relief spring disposed within the central bore of the main poppet and configured to bias the relief valve element toward a flow-blocking position.

6. The metering valve of claim 5, further including:
   a force feedback spring disposed between the pilot element and the main poppet to bias the main poppet toward the flow-blocking position; and
   a pilot spring configured to bias the pilot element toward the flow-blocking position.

7. The metering valve of claim 1, wherein the main poppet includes external channels configured to provide an increasing flow of pressurized fluid from the inlet to the control chamber as the main poppet moves toward the flow-passing position.

8. The metering valve of claim 7, wherein at least a portion of the pressurized fluid from the inlet is always in communication with the control chamber via the external channels.

9. The metering valve of claim 1, further including a solenoid mechanism associated with the relief valve element to provide variable relief settings.

10. The metering valve of claim 9, wherein the solenoid mechanism directly biases the relief valve element.

11. The metering valve of claim 9, wherein the solenoid mechanism directly biases a second relief valve element to drain fluid from an end of the relief valve element to thereby provide variable relief settings.

12. A method of operating a metering valve, comprising:
   moving a pilot element between a flow-blocking position at which pressurized fluid from a chamber of an actuator retains a main poppet in a flow-blocking position to block fluid from flowing from the chamber, and a flow-passing position at which a control end of the main poppet is communicated with a drain to move the main poppet toward a flow-passing position to drain the chamber; and
   automatically moving the main poppet toward the flow-passing position by automatically draining the control end of the main poppet in response to a pressure of the fluid within the chamber exceeding a predetermined value to allow fluid to drain from the chamber.

13. The method of claim 12, further including automatically moving the main poppet toward the flow-passing position in response to a pressure of the fluid within the chamber dropping below a predetermined value to allow fluid to flow into the chamber.

14. The method of claim 12, further including restricting the flow of at least a portion of the fluid draining from the control end to dampen pressure fluctuations during the automatic moving of the main poppet.

15. The method of claim 12, further including always communicating at least a portion of the fluid within the chamber with the control end of the main poppet.

16. The method of claim 15, further including increasing the rate of fluid flow from the chamber to the control end of the main poppet as the main poppet is moved toward the flow-passing position.

17. The method of claim 12, further including varying the predetermined value.

18. The method of claim 17, wherein varying includes energizing a solenoid mechanism to directly bias a relief valve element.

19. The method of claim 17, wherein varying includes energizing a solenoid to drain fluid from an end of a relief valve element to indirectly bias the relief valve element.

20. A work machine, comprising:
   a work implement;
   a hydraulic cylinder configured to move the work implement; and
   a valve configured to drain a chamber of the hydraulic cylinder, thereby affecting movement of the work implement, the valve including:
      a valve body having an inlet associated with the chamber, and an outlet associated with a low pressure reservoir;
      a main poppet being disposed within the valve body between the inlet and the outlet, having a nose end and a control end, and being movable between a flow-passing position at which fluid flows from the chamber through the inlet to the low pressure reservoir via the outlet, and a flow-blocking position at which fluid flow between the chamber and reservoir is blocked;
      a solenoid-operated pilot element having a central bore extending through the pilot element,
      wherein the pilot element is movable between a flow-blocking position at which pressurized fluid from the chamber pressurizes a control chamber in communication with the control end of the main poppet to urge the main poppet toward the flow-blocking position, and a flow-passing position at which the control chamber is communicated with the reservoir to move the main poppet toward the flow-passing position; and
      a relief valve element disposed within a central bore of the main poppet and configured to drain pressurized fluid from the control chamber to move the main poppet toward the flow-passing position in response to a pressure in the chamber exceeding a predetermined pressure, wherein the main poppet is automatically movable toward the flow-passing position to allow fluid to flow from the reservoir to the chamber when the pressure in the reservoir exceeds the pressure in the chamber.

21. The work machine of claim 20, further including:

a restrictive orifice disposed within the relief valve element and configured to dampen pressure fluctuations of the fluid draining through the relief valve element; and a relief spring disposed within the central bore of the main poppet and configured to bias the relief valve element toward a flow-blocking position.

22. The work machine of claim 20, wherein:

the main poppet includes external channels configured to provide an increasing flow of pressurized fluid from the inlet to the control chamber as the main poppet moves toward the flow-passing position; and at least a portion of the pressurized fluid from the inlet is always in communication with the control chamber via the external channels.

23. The work machine of claim 20, further including a solenoid mechanism associated with the relief valve element to provide variable relief settings, wherein the solenoid mechanism directly biases the relief valve element.

24. The work machine of claim 20, further including a solenoid mechanism associated with the relief valve element to provide variable relief settings, wherein the solenoid mechanism directly biases a second relief valve element to drain fluid from an end of the relief valve element to thereby provide variable relief settings.

* * * * *